United States Patent
Rietmann et al.

(10) Patent No.: US 9,166,407 B2
(45) Date of Patent: Oct. 20, 2015

(54) IMPLEMENTING SUBSTATION AUTOMATION LOAD TRANSFER FUNCTION

(75) Inventors: Peter Rietmann, Gebenstorf (CH); Wolfgang Wimmer, Rietheim (CH)

(73) Assignee: ABB TECHNOLOGY AG, Zurich (CH)

( * ) Notice: Subject to any disclaimer, the term of this patent is extended or adjusted under 35 U.S.C. 154(b) by 1109 days.

(21) Appl. No.: 13/168,086

(22) Filed: Jun. 24, 2011

(65) Prior Publication Data

US 2011/0320058 A1 Dec. 29, 2011

(30) Foreign Application Priority Data

Jun. 24, 2010 (EP) .................... 10167226

(51) Int. Cl.
| | |
|---|---|
| H01H 35/00 | (2006.01) |
| H01H 83/00 | (2006.01) |
| H02J 3/00 | (2006.01) |
| G06F 19/00 | (2011.01) |
| H04B 3/54 | (2006.01) |

(52) U.S. Cl.
CPC .............. H02J 3/006 (2013.01); G06F 19/00 (2013.01); *H02J 2003/001* (2013.01); *H04B 3/54* (2013.01); *Y04S 10/525* (2013.01)

(58) Field of Classification Search
CPC .......... G06F 19/00; G06F 15/16; H04B 3/54; G01R 31/327; H03K 17/962; H03K 17/945; H03K 17/955; H03K 17/9645; H05B 39/085
USPC .............. 307/116, 112, 140, 125, 80, 85; 709/224, 232, 217; 700/286, 293, 295, 700/297; 702/57, 1, 60
See application file for complete search history.

(56) References Cited

U.S. PATENT DOCUMENTS

| | | |
|---|---|---|
| 2002/0059477 A1 | 5/2002 | Wimmer et al. |
| 2007/0239372 A1 * | 10/2007 | Schweitzer ............. 702/57 |
| 2010/0204948 A1 * | 8/2010 | Kirrmann et al. ........ 702/117 |
| 2010/0325304 A1 * | 12/2010 | Wimmer ................ 709/232 |
| 2011/0208366 A1 * | 8/2011 | Taft ...................... 700/295 |

FOREIGN PATENT DOCUMENTS

| | | | |
|---|---|---|---|
| EP | 1 191 662 A1 | 3/2002 | |
| EP | 2 088 444 A1 | 8/2009 | |
| EP | 2 194 656 A1 | 6/2010 | |
| EP | 2194656 A1 * | 6/2010 | ............ H04B 3/54 |
| EP | 2 264 967 A1 | 12/2010 | |

OTHER PUBLICATIONS

European Search Report for EP 10167226 dated Oct. 18, 2010.

* cited by examiner

*Primary Examiner* — Rexford Barnie
*Assistant Examiner* — Jagdeep Dhillon
(74) *Attorney, Agent, or Firm* — Buchanan Ingersoll & Rooney PC

(57) ABSTRACT

A process of implementing, or engineering, topology-dependent functions based on a formal description of the Substation Automation system, includes performing a topology analysis of the current single line state. A topology interpreting implementation replacing complex topology analysis logics can include the project specific static single line topology and the connection to the real process state data. All information can be delivered in an IEC 61850 conforming SCD file. The interface description for controlling and monitoring the load transfer application can be generated automatically from the SCD file.

6 Claims, 2 Drawing Sheets

IMPLEMENTING SUBSTATION AUTOMATION LOAD TRANSFER FUNCTION

RELATED APPLICATION

This application claims priority under 35 U.S.C. §119 to European Patent Application No. 10167226.9 filed in Europe on Jun. 24, 2010, the entire content of which is hereby incorporated by reference in its entirety.

FIELD

The disclosure relates to the field of Substation Automation (SA) systems with a standardized configuration representation. More particularly, it relates to a method of implementing a load transfer function.

BACKGROUND INFORMATION

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation (SA) system. The SA system includes secondary devices, among which Intelligent Electronic Devices (IED) responsible for protection, control and monitoring of the primary devices. The secondary devices may be hierarchically assigned to a station level or a bay level of the SA system. The station level often includes a supervisory computer that includes an Operator Work Station (OWS) with a Human-Machine Interface (HMI) and running a station-level Supervisory Control And Data Acquisition (SCADA) software, as well as a gateway that communicates the state of the substation to a Network Control Centre (NCC) and receives commands from it. IEDs on the bay level, also termed bay units, in turn are connected to each other as well as to the IEDs on the station level via an inter-bay or station bus primarily serving the purpose of exchanging commands and status information.

A communication standard for communication between the secondary devices of a substation has been introduced by the International Electrotechnical Committee (IEC) as part of the standard IEC 61850 entitled "communication networks and systems in substations". For non-time critical report messages, section IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet and/or RS-232C as physical media. For time-critical event-based messages, such as trip commands, IEC 61850-8-1 specifies the Generic Object Oriented Substation Events (GOOSE) directly on the Ethernet link layer of the communication stack. For very fast periodically changing signals at the process level such as measured analogue voltages or currents section IEC 61850-9-2 specifies the Sampled Value (SV) service, which like GOOSE builds directly on the Ethernet link layer.

SA systems based on IEC61850 are configured by means of a standardized configuration representation or formal system description called Substation Configuration Description (SCD). An SCD file includes the logical data flow between the IEDs on a "per message" base, i.e. for every message source, a list of destination or receiver IEDs, the message size in terms of data set definitions, as well as the message sending rates for all periodic traffic like reports, GOOSE, and SV.

Substation Automation (SA) systems include a number of basic SA functions for protection, control and monitoring of the substation, and which functions relate to individual pieces of primary equipment or to entire substation bays. In addition, higher-level applications are provided, which involve at least a station level operator HMI and/or the connection to a remote operation place or network control center by means of a gateway. Known applications are used as operator support or for automating handling of emergency situations within the station. They require operational information from more than one piece of primary equipment, even from more than one bay, and hence are termed "inter-bay", "station-level", or "distributed". In addition to a possible primary functional or operational goal, a configuration of such inter-bay applications therefore also relies on the dynamic switchyard configuration or topology, as well as the basic SA functions used to gather data from the switchyard and execute commands on it. Known inter-bay functions are station-level interlocking, station and bay level switching sequences, transformer parallel control, transformer auto close functions, as well as any other kind of load transfer and/or shedding.

Conventionally, inter-bay functions are engineered or implemented on top of an existing SA system, the latter providing the process state information and some means to control the process. This engineering is done manually, by instantiating the needed function blocks and connecting them signal-wise to the existing SA system.

In the context of the present disclosure, a load transfer function or application is understood to involve and coordinate substation primary devices in order to maintain, following a failure or emergency, a supply of power to the loads connected to the substation in a sustainable way, e.g., without overloading the substation equipment that is not affected by the failure. By way of example, a transformer auto-close function transfers or assigns, in case of a failure of a coupling transformer, the load previously supplied via the failed equipment to other coupling transformers. In simple cases, where only two in-feeding bays or in-feed related bus bar sections exist and where the relations between load and transport capacity are known in advance, it is straightforward to determine which circuit breakers need to be closed to transfer the load. However, in more complex single line configurations an analysis of the current or instantaneous state, based on a current state of a plurality of switching elements, is needed to determine the circuit breaker to be closed in a particular fault case.

Load transfer functions can be triggered by failures of in-feeding or transporting parts, and are used in different variants in the substation automation area, often in medium voltage systems for industrial processes. One example is the high speed in-feed transfer, where two bus bar segments each have one or more in-feeds, feeding the load at the appropriate bus bar segment. A failure at one of the in-feeds leads to a protection trip disconnecting this in-feed. The resulting drop of frequency due to the overload triggers the closing of the bus section between the two bus bar segments, thus sharing the remaining in-feeds with all loads. In this simple topology, no topology analysis is necessary—the drop of frequency signals an overload situation, which then leads to a load transfer to the one still healthy bus bar segment.

Another example is the transformer auto close function, where two pairs of transformers coupled at the HV side feed two different bus bar segments at the MV side, to each of which approximately half of the total load is connected. Any three out of the four transformers can sustain the sum of all loads. Therefore in case of a transformer trip due to some protection functions, the load of the affected transformer pair, together with the remaining transformer of the affected pair, has to be transferred or assigned to the unaffected transformer pair.

In case of a simple bus bar scheme the logic to decide if a situation allows a load transfer and which circuit breakers to close for the load transfer is relatively simple. In more complex bus bar situations a complex logic is required, the implementation and testing of which is specific for each project or single line diagram, as well as error prone due to the complexity. Finally, at network level, as opposed to substation level, e.g. in distribution automation, topology based function implementations are used for load balancing, load shedding or system reconfiguration, based on an implementation specific topology representation. However, in this case, the configuration input of the correct network topology is likewise far from being trivial.

According to the patent application EP-A 1191662 an engineering wizard for an SA function can automatically generate the data flow between IEDs and a function configuration, based on known switchgear parameter values and function block allocation to the switchgear as obtained from a Substation Configuration Description. In particular, the configuration of a first SA function involves allocating this function to a primary device and an IED. Following this, a primary device model and a topology model are used to automatically determine second, more basic, SA functions, of which data or procedures are specified by the first SA function during operation. If specified, the corresponding communication links between the first SA function and the second SA functions are determined automatically on the basis of a communication model representing communication means.

The patent application EP-A 2088444 proposes that protection, measurement and control IEDs in a substation compute, according to interlocking rules or physical principles as well as a knowledge of the dynamic topology of the substation, for every switch they control if that switch may be operated safely, in contrast to a conventional and separate programming of the interlocking logic for each IED. To this purpose, the IEDs have access to the substation electrical topology, to the real-time information generated by other IEDs, and to the rules for interlocking. The disclosure takes advantage of a standardized Substation Configuration Description (SCD) of the substation for which the SA system is intended, as well as of a standardized description of the implemented device functions or capabilities of an individual IED. In particular, the substation topology is available from the substation configuration description (SCD file in IEC 61850 format), the real time information about the position of switches and line voltage/current can be read over the IEC 61850 protocol and the rules are available in script form. This concept applies both to simulated and real devices, and greatly increases system testing possibilities by supporting an efficient configuration of a simulation.

SUMMARY

An exemplary method of implementing a load transfer function in a Substation Automation SA system for a substation supplying electric power to a load is disclosed. The method comprises reading a standardized configuration description of the SA system, to obtain a static topology representative of at least a part of the substation as well as information about primary elements of the substation; and repeatedly updating a dynamic substation topology based on a switch status of a switching device of the substation. For a transformer connecting a first bus bar to a second bus bar of the substation, the method also comprises identifying, based on the dynamic substation topology, primary elements arranged between the first and second bus bar; determining a load transfer function by selecting, based on a status of the identified primary elements, a primary element that has to be activated in order to connect the first to the second bus bar; and storing the load transfer function to be executed in case of a failure of the transformer.

BRIEF DESCRIPTION OF THE DRAWINGS

The subject matter of the disclosure will be explained in more detail in the following text with reference to preferred exemplary embodiments which are illustrated in the attached drawings, in which.

DETAILED DESCRIPTION

Figure 1:
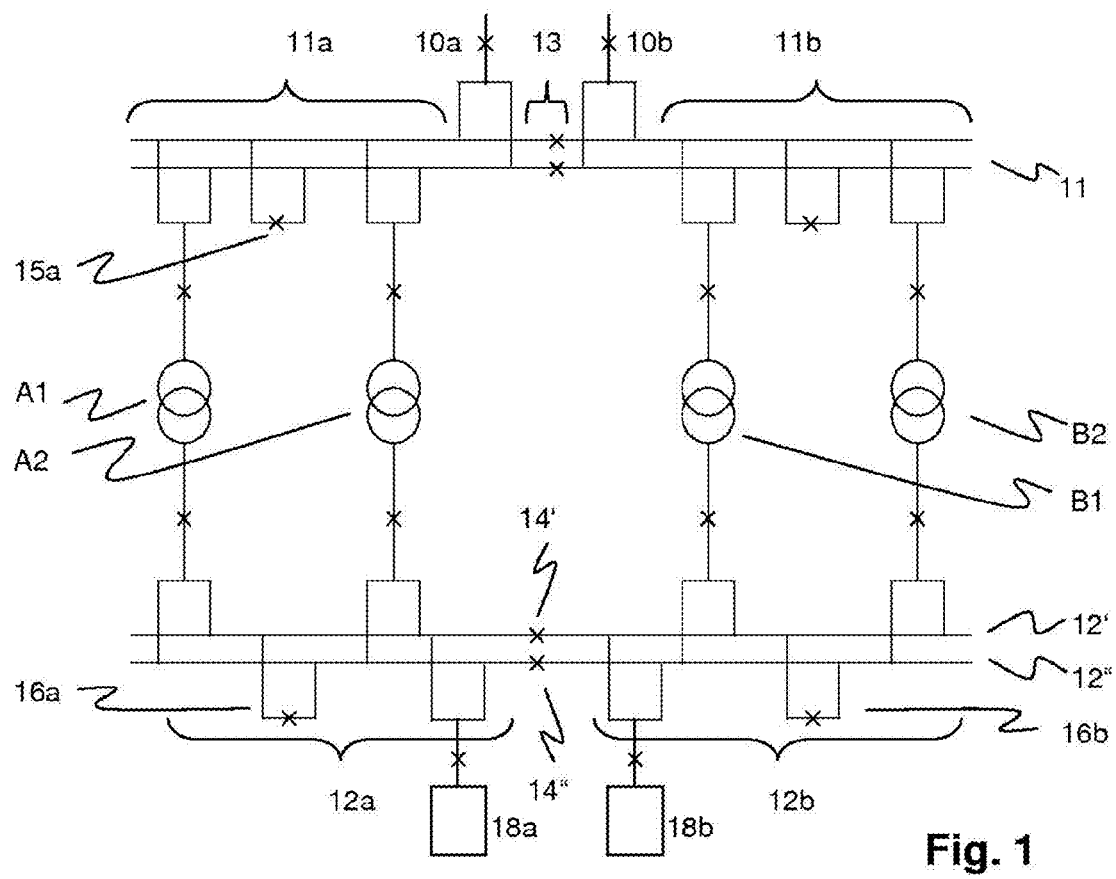
FIG. 1 illustrates a single line diagram of an excerpt of a substation, in accordance with an exemplary embodiment.

It is therefore an objective of the exemplary embodiments of the present disclosure to simplify the implementation of load transfer functions in SA systems.

According to exemplary embodiments of the present disclosure, a method of implementing, or establishing, a load transfer function in a Substation Automation SA system for an electric power transmission/distribution substation supplying power to a number of loads and includes first and second, or high and medium voltage, bus bars interconnected by transformers. The method includes the steps of reading a standardized configuration description of the SA system, and obtaining therefrom a static topology representative of at least a part of the substation as well as information about primary elements, in particular switching devices, of the substation, and repeatedly, or continually, updating a dynamic instantaneous substation topology representative of at least said part of the substation, based on a switch status of a number of switching devices of the substation.

For a transformer connecting the first bus bar to the second bus bar of the substation, the method also includes identifying, based on the dynamic substation topology, primary elements, other than said transformer, arranged between the first and second bus bar, and determining a load transfer function as a remedial load-preserving action by selecting, based on a status indicating operational availability of the identified primary elements, at least one of these primary elements, such as a switching device, that can be operated, or activated, to connect the first bus bar to the second bus bar and thus creating a bypass to the transformer.

The method also includes storing the most suitable load transfer function to be executed in case of a failure of the transformer or an adjacent, or of any primary element between the transformer and one of the bus bars, and eventually display it in a suitable format to an operator of the system.

In other exemplary embodiments the disclosure, availability of sufficient transformer capacity between the first bus bar and the second bus bar, as provided by non-failing transformers, as well as availability of switching devices or transformer tab changers can be established. Switching devices being locked for operation, e.g. due to being serviced, and transformers that do not provide the tab changer range as specified to balance local voltages can be disregarded when determining the load transfer function.

In still other exemplary embodiments of the disclosure, the SA communication network or substation bus can be continuously monitored for network messages, such as GOOSE and MMS, indicative of a changing status of switching devices or of the transformer itself. Switching devices opening or closing can determine the dynamic topology of the substation, whereas transformer status reports or transformer related protection commands can point to an imminent failure or controlled disconnection of the transformer.

In summary, the exemplary embodiments provided in the disclosure relate to a process of implementing, or engineering, topology-dependent functions based on a formal description of the Substation Automation system, by performing a topology analysis of the current single line state. A topology interpreting implementation replacing complex topology analysis logics can specify only the project specific static single line topology and the connection to the real process state data. All this information can be delivered in an IEC 61850 conforming SCD file, which readily exists for any IEC 61850 based system. The engineering and testing effort of automatic load transfer functions for more complex single line topologies can thus be reduced. Also, the interface description for controlling and monitoring the load transfer application can be generated automatically from the SCD file.

The exemplary embodiments of the present disclosure can also relate to a device adapted to be connected to a communication network of an SA system and configured to host a load transfer function, as well as to a computer program including computer program code for controlling a processor of the device.

FIG. 1 illustrates a single line diagram of an excerpt of a substation, in accordance with an exemplary embodiment. FIG. 1 shows a single line diagram of an excerpt of a substation with in-feed 10a, 10b to a double busbar 11 at the High Voltage (HV) side, a double bus bar 12 at the Medium Voltage (MV) side, and two pairs of transformers A, B coupling the bus bars. The HV bus bars 11 can be sectioned into in-feed related bus bar sections 11a, 11b via section circuit breakers 13, and the MV bus bars 12 can be sectioned into load bus bar sections 12a, 12b. The two bus bars of each section can be connected via coupling circuit breakers 15, 16. During normal operation, the two transformer pairs feed the two load bus bar segments 12a, 12b and the respective loads 18a, 18b at the MV side individually, e.g., section circuit breakers 13, 14 are open. Adjacent to the circuit breakers 13, 14, 15, 16, a number of disconnectors (not depicted in FIG. 1) can be provided. Accordingly, and depending on the state of the latter and the coupling circuit breakers, other generic transformer pairs such as A1B1 or A1B2 could be formed.

One transformer alone should not be capable of feeding the connected load, however three transformers can sustain the sum of all loads. Therefore, exemplary transformer A1 due to some protection functions, the load 18a of the affected transformer pair, together with the remaining transformer A2 of the pair, can be transferred or connected to the unaffected transformer pair B1, B2. The same applies if other in-feed related primary elements, such as the further switching devices serially connected with one of the transformers in-between the bus bars 11, 12, fail or become inoperable for any reason.

Figure 2:
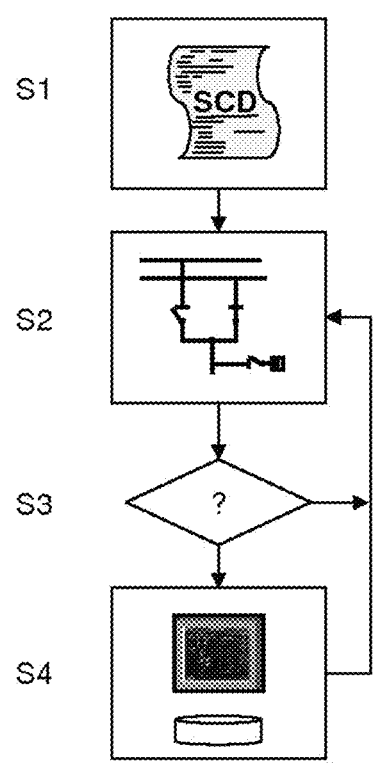
FIG. 2 is a flowchart of the implementation of load transfer functions in accordance with an exemplary embodiment.

FIG. 2 is a flowchart of the implementation of load transfer functions in accordance with an exemplary embodiment. In a first step S1, as part of an engineering process, for example, a static topology or structure of the substation in standardized description or format is provided and read.

In a second step S2, during regular operation of the SA system, messages indicative of a status of at least one switching device in the substation, generated by an IED of the SA system and transmitted over an SA communication network, are intercepted and evaluated. In terms of the substation communication standard IEC 61850, the standardized description is a Substation Configuration Description (SCD) file, while the network messages are Generic Object Oriented Substation Events (GOOSE) or MMS reporting. Accordingly, during operation an expert program obtains the current switch states as ".Pos"-attributes from the XCBR and XSWI Logical Nodes allocated to the switching devices, and evaluates the static topology and the actual switch states to produce or update a dynamic topology of the substation.

In a third step S3, the load transfer expert program decides whether, for the current dynamic substation topology, in case of a forthcoming failure of a single primary device a load transfer would be possible and allowed. A limited number of hypothetical failure scenarios, such as a failed in-feed line or transformer, are evaluated, and load preserving remedy scenarios are determined. The latter include an indication or pre-selection of specific circuit breakers or other switching devices to be operated, and/or transformer tap changers to be adjusted.

In a fourth step S4, the remedial action is stored for further reference, and review if the assumed hypothetical failure scenario actually occurs, and/or output to an operator of the SA system. The process resumes at step S2 as soon as a change to the dynamic substation topology is reported.

Certain conditions should be met in order before an envisaged load transfer action can qualify as a load preserving action. On the one hand, the existence of suitable paths in parallel to, and thus bypassing, the failed primary element is ascertained. Such path or paths represent viable alternatives to provide power from the remaining or active in-feeds to the load or the loads that are negatively affected by the failing primary element. On the other hand, the availability of suitable switching devices along or in relation to the paths, such as circuit breakers or disconnectors for the suitable switching operation, the availability of transformers to adjust the tap changer positions and eventually the state of the automatic voltage regulation has to be ascertained. This includes verifying that switching devices are not blocked or being serviced. Due to the inherent semantics of an IEC 61850 data model, all this information can be found automatically by means of the same SCD file containing the single line topology. In short, specific properties of the connected primary elements as needed for the load transfer case are considered, and the relations to the neighboring elements are then evaluated to determine the circuit breakers to be closed in case of a certain expected failure situation.

By way of example and with reference to FIG. 1, the analysis in case of transformer auto close in view of a failure or disconnection of transformer A1 includes verifying that, at the very instant. The unaffected or remaining transformers A2, B1, B2 are connected in parallel at the HV side and together have the capacity to supply the total load 18a plus 18b. Any alternative path between the bus bar segments 11a, 12a of the affected transformer A1 encompasses, at the MV side, at least one of the section circuit breakers 14', 14" and the coupling circuit breakers 16a, 16b. With all transformers connected to the same bus bar 12' of the MV double bus bar, two possibilities arise. The first one includes section circuit breaker 14' only, while the second one involves both coupling circuit breakers 16a, 16b as well as section circuit breaker 14". As long as no disconnectors are open and section circuit breaker 14' is not blocked, the first possibility is preferred for involving fewer devices. Accordingly, upon disconnection of A1, some of the circuit breakers 14, 16 are closed, and the bus bar segments 12a and 12b at MV side are automatically connected thus joining the remaining transformer A2 to the healthy transformer pair B1, B2. The total load is then provided by the three transformers A2, B1, B2 at more or less equal shares.

Detection and identification of an expected failure case then triggers the closing of the circuit breakers pre-selected for this failure case according to the previous steps. Detection of a failure situation can be achieved via monitoring of network messages on the SA communication network that are indicative of specific trigger events, such as the connection state of the transformers or, more general, instantaneous topology changes. Another possibility is to trigger the auto close operation by means of transformer protection trips. Relevant trips can also be found in the SCD file by looking to PTOC (Time dependent Over Current), PDIF (Differential Protection), or PTRC (Trip Conditioning matrix) Logical Nodes allocated to the transformers.

Additionally, actual load measurements and known maximum capacities of the various in-feeds and bus bar sections, defining a consolidated power transport capacity, can be used to determine the allowance of a load transfer. Hence, summing up the available in-feed respective transport capacity and the instantaneous loads per connected bus bar part allows deciding if and where a load transfer is allowed. Again, the topology is the base to automatically calculate the in-feed power capacity to a bus bar segment and the existing load per bus bar segment. According to a sub-variant, in case not all loads can be sustained after a load transfer, load shedding of an excess load may be envisaged. Such load shedding may lead to less loss of load as if no load transfer were possible at all, and offers the possibility to shed low-priority load from the connected healthy part in order to sustain high-priority load.

As it is assumed that the second transformer of a pair remains operational, and that it can carry the excess load for some time, the closing operation for the circuit breakers can be done via the normal Select-Before-Operate mechanism needing no additional engineering at the bay controllers. On the other hand, to enable a reasonably fast load transfer, the operation of disconnectors as part of the load transfer function should be avoided. Furthermore, the topology analysis function can signal to the bay controllers that a circuit breaker is selected for transformer auto close operation. Hence, as soon as the transformer trip occurs, the bay controller can directly close the selected circuit breaker, thus reducing the load transfer time from 1-2 seconds down to 10-100 ms.

Figure 3:
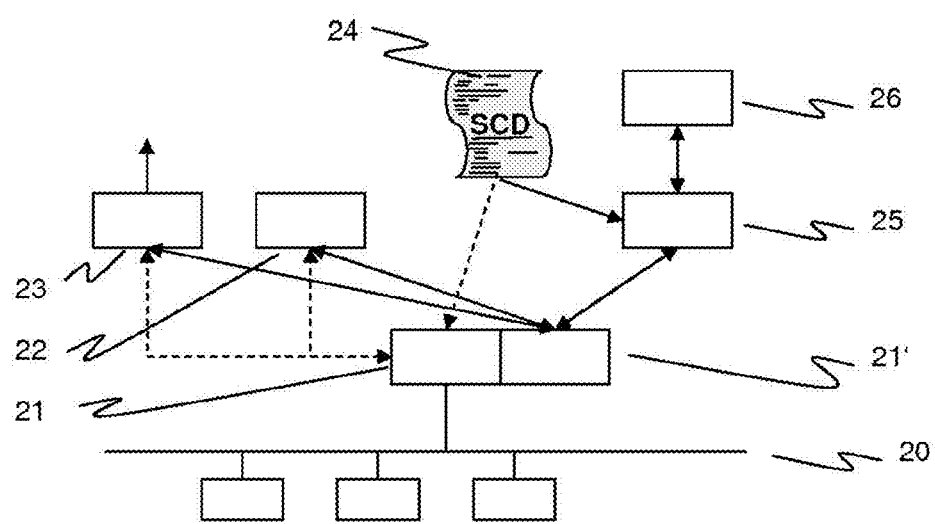
FIG. 3 illustrates the architecture of a load transfer function implementation in accordance with an exemplary embodiment.

FIG. 3 illustrates the architecture of a load transfer function implementation in accordance with an exemplary embodiment. In particular, FIG. 3 shows an exemplary architecture for a centralized implementation of Transformer Auto Close (TRAC) functionality As shown in FIG. 3, a substation communication network or station bus 20 according to IEC 61850, can communicatively connect a number of IEDs to an IEC 61850 OPC server 21 assigned to a substation level of the SA system. The OPC server 21 can be connected to a MicroSCADA 22 and Gateway 23 application (indicated in FIG. 3 by broken connectors), enabling the latter to interact with the IEDs. The connection to the process via the IEC 61850 OPC server 21 can be configured by means of an SCD file 24. Additionally, triggering transformer protection trips can be configured by means of the SCD file of the substation.

According to an exemplary embodiment of the present disclosure, the TRAC functionality 25 can be configured by means of the SCD file 24. The signals to control and monitor the TRAC function itself are provided to an HMI 26. Alternatively or additionally, TRAC controlling and monitoring can be enabled to the abovementioned OPC clients MicroSCADA 22 and Gateway 23 by means of the OPC server 21. To this purpose, TRAC is modelled as IEC 61850 IED, wherein the Implemented IED Description IID file for such a virtual IEC 61850 IED can be generated automatically from the SCD file, as described in the unpublished patent application EP09162906.3. Due to the switch yard related naming scheme of logical devices and logical nodes in the IID file, the TRAC application connects automatically to the former. Some of the information from the SCD file such as the static single line diagram as well as the connection of the single line elements to the process state can be internally converted to the names of OPC items of the OPC server. Hence, the interface description for controlling and monitoring the load transfer application can be generated automatically from a formal description or structure of the base SA system as e.g. included in an IEC 61850 SCD file. The interface data can be structured into Logical Nodes according to IEC 61850, whereby the LNs in turn can further be connected to the process single line diagram and optionally integrated into the SCD file of the base SA system, thereby generating an enhanced SCD file.

As opposed to a centralized implementation of the TRAC functionality, where all aspects with the possible exception of the OPC server are handled by one single, station-level IED, a more distributed implementation can also be automatically engineered. In this case, the topology based analysis part is allocated to one IED, which then communicates to other IEDs, such as the bay controllers, about the selected circuit breakers in case of a TRAC trigger. To this end, the circuit breaker related logical nodes are allocated to the appropriate bay controllers.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:
1. A method of implementing a load transfer function in a Substation Automation SA system for a substation supplying electric power to a load, comprising:
    reading a standardized configuration description of the SA system, to obtain a static topology representative of at least a part of the substation as well as information about primary elements of the substation;
    repeatedly updating a dynamic substation topology based on a switch status of a switching device of the substation;
    for a transformer connecting a first bus bar to a second bus bar of the substation, identifying, based on the dynamic substation topology, primary elements arranged between the first and second bus bar;
    determining a load transfer function by selecting, based on a status of the identified primary elements, a primary element that has to be activated in order to connect the first to the second bus bar; and
    storing the load transfer function to be executed in case of a failure of the transformer.

2. The method according to claim 1, wherein determining the load transfer function comprises:
confirming that sufficient transformer load capacity between the first bus bar and the second bus bar is available following a failure of the transformer.

3. The method according to claim 2, wherein the status of the identified primary elements includes an availability of switching devices or transformer tab changers.

4. The method according to claim 1, wherein the SA system includes a communication network, the method comprising:
repeatedly updating the dynamic substation topology based on network messages indicative of a switch status of the switching.

5. The method according to claim 4, comprising:
monitoring a status of the transformer based on network messages indicative of a health condition and/or of an imminent disconnection of the transformer.

6. The method according to claim 1, comprising:
generating an interface of the load transfer function in terms of Logical Nodes according to IEC 61850; and
hosting the interface on a Substation Automation device connected to a communication network (20) of the SA system.

\* \* \* \* \*